United States Patent [19]
Yang et al.

[11] Patent Number: 5,506,683
[45] Date of Patent: Apr. 9, 1996

[54] NON-CONTACT MEASURING APPARATUS FOR THE SECTION PROFILE OF A TIRE AND ITS METHOD

[75] Inventors: Yoon-Mo Yang, Choongcheongbook-do; Jae-Moon Jeong, Pusan; Seon-Il Kim, Kyungsangnam-do; Ki-Jeon Kim, Kwangju, all of Rep. of Korea

[73] Assignee: Kumho & Co., Inc., Seoul, Rep. of Korea

[21] Appl. No.: 693,297

[22] Filed: Apr. 30, 1991

[30] Foreign Application Priority Data

| Apr. 30, 1990 | [KR] | Rep. of Korea | ..................... | 6152/1990 |
| Apr. 30, 1990 | [KR] | Rep. of Korea | ..................... | 6153/1990 |
| Apr. 30, 1990 | [KR] | Rep. of Korea | ..................... | 6154/1990 |
| Apr. 30, 1990 | [KR] | Rep. of Korea | ..................... | 6155/1990 |

[51] Int. Cl.$^6$ .................................................. G01B 11/24
[52] U.S. Cl. ................................................................ 356/376
[58] Field of Search .............................................. 356/376

[56] References Cited

U.S. PATENT DOCUMENTS

| 4,494,874 | 1/1985 | DiMatteo et al. | ........................ | 356/376 |
| 4,547,674 | 10/1985 | Pryor et al. | ............................... | 356/376 |
| 4,585,350 | 4/1986 | Pryor et al. | ............................... | 356/376 |
| 4,721,388 | 1/1988 | Takagi et al. | .............................. | 356/376 |
| 4,925,308 | 5/1990 | Stern et al. | ............................... | 356/376 |
| 4,982,103 | 1/1991 | Meiffren et al. | ......................... | 356/376 |
| 4,993,835 | 2/1991 | Inoue et al. | ............................... | 356/376 |
| 5,112,131 | 5/1992 | Pryor | ........................................ | 356/376 |

FOREIGN PATENT DOCUMENTS 0253108 10/1990 Japan .................................... 356/376

OTHER PUBLICATIONS

Ishimatsu, Kawasue et al., "Real–Time Measurement of Fry in the Cultivation Field Using a Line–Image Sensor," 4 pages No Date.

Li et al., "Subpixel Edge Detection and Estimation with a Line Scan Camera," 1987 IEEE, IECON '87, pp. 667–675.

Ishimatsu, Taguchi et al., "Acquiring 3–Dimensional Data of a Human Face Using a Laser Slit–Ray Projection Method," 6 pages no date.

Primary Examiner—Richard A. Rosenberger
Attorney, Agent, or Firm—Lowe, Price, LeBlanc & Becker

[57] ABSTRACT

This invention comprises a sensor (40) having a slit-ray generator (41) and a camera (42), a calibration block (100) for calibrating 3-dimensional coordinate values, a computer (10) for processing 2-dimensional coordinate values of the calibration block (100) and the object (90) to obtain data of 3-dimensional space coordinate and output it to CRT (60), a robot hand (10) for moving the sensor (40) on multiple axes. Therefore, this invention can measure the section profile shape of a tire, etc. accurately and quickly.

1 Claim, 10 Drawing Sheets

$d_2 > d_1 \rightarrow \ell_2 > \ell_1$

NON-CONTACT MEASURING APPARATUS FOR THE SECTION PROFILE OF A TIRE AND ITS METHOD

BACKGROUND OF THE INVENTION

The present invention relates generally to a method of and an apparatus for measuring accurately the shape of a particular part or all of an object, particularly to a method of and an apparatus for measuring the section profile of a tire without contacting the surface of the tire, by measuring continuously the profile of the tire with a camera and a non-contact type slit ray profile detective sensor in order to eliminate the dead angle that occurrs in the measuring of the profile, thereby to increase its accuracy and speed in 3-dimensional measuring.

In general, even when any particular object is measured by using a conventional contact-type shape detective sensor, if the object is a relatively hard solid, measurement errors do not occur, but if the object is semi-solid, or in case the original shape of the object is deformed by contacting the sensor on the surface of the object, a considerable error results. In case the shell profile of a tire having a side wall and tread is measured, said contact-type sensor can not dispense with some error in the measurement itself. Even though the existing non-contact types of measuring apparatus are used to determine 3-dimensional coordinate values, the measurement must be made several times, and in tedious repetition with the use of various implements with the results being compared with each other, and yet no escape from some errors.

SUMMARY OF THE INVENTION

The principle object of the present invention is to provide a 3-dimensional profile measuring apparatus and a method which can notably increase efficiency and accuracy, and to overcome the various problems of prior art profile measuring apparatuses as given above.

Another object of the present invention is to provide a robot hand for said 3-dimensional profile measuring apparatus.

Out of the present invention disclosed herein, a typical one will now be described briefly;

An apparatus for measuring the section profile shape of a tire, said apparatus comprising : a sensor including a slit-ray generator and a camera, a calibration block for calibrating the information obtained from the tire by the camera, a computer for outputting to a CRT the information on the 3-dimensional shape of the tire obtained by processing 2-dimensional coordinate data generated from said sensor, in correspondence with data of the 3-dimensional coordinate of said calibration block; a robot hand for changing the measuring position of said sensor on multiple axes, a robot driver for controlling said robot hand on multiple axes corresponding to the program in the computer.

Other and further objects, features and advantages of the invention will appear more fully from the following detailed description with reference to the accompanying drawings.

DESCRIPTION OF A PREFERRED EMBODIMENT

A preferred embodiment of the present invention is described in detail by referring to the accompanying drawings.

Figure 1:
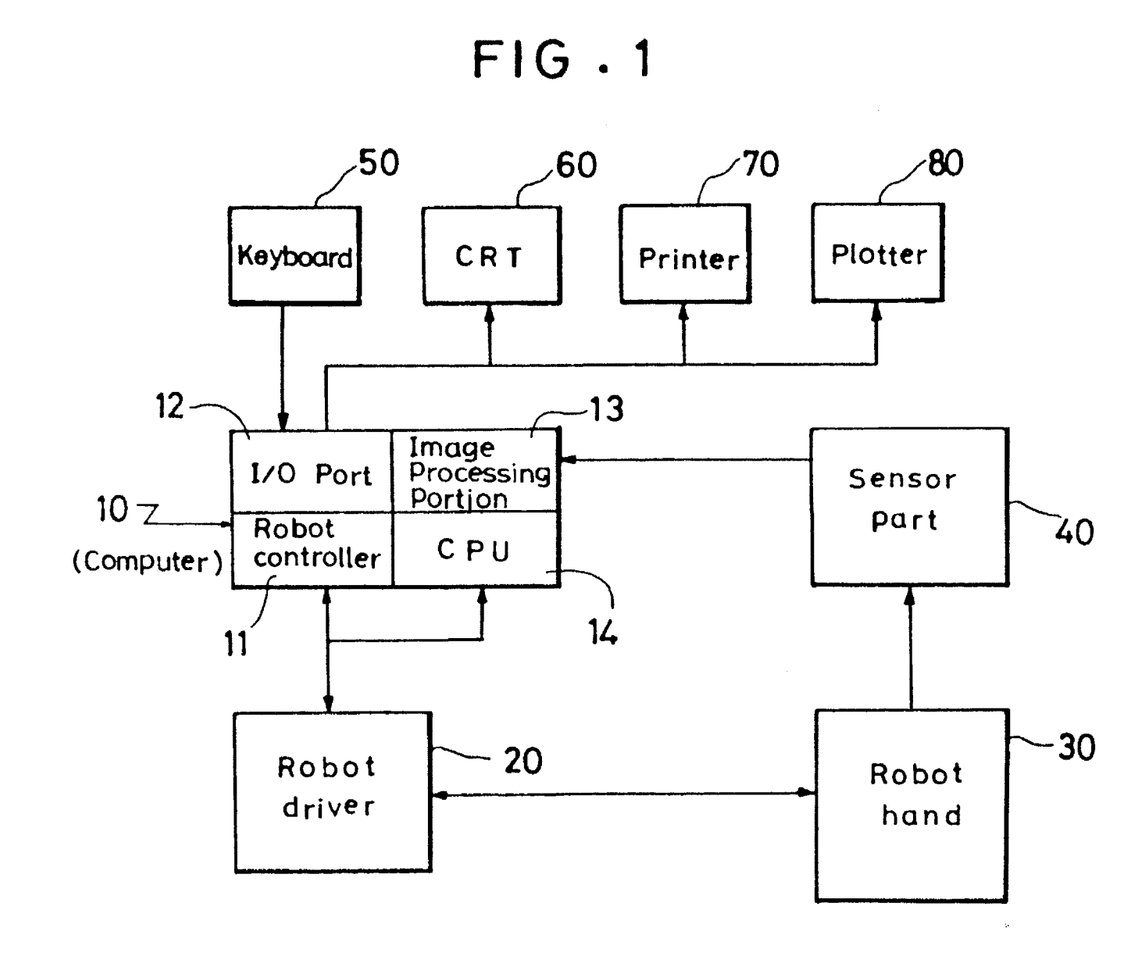
FIG. 1 is a block diagram of an embodiment of a non-contact measuring apparatus according to the present invention.

As shown in FIG. 1, the computer 10 (which includes I/O ports, an image processor 13, a robot controller 11 and CPU 14) communicates data with the robot driver 20. Robot hand 30 driven by robot driver 20 controls the position of the non-contact type shape measurement sensor 40. Profile measurement signals generated by said non-contact type profile measurement sensor 40 are supplied via computer to the CRT 60, the printer 70, and the plotter 80, etc. Shape measurement executive signals or data are supplied to I/O ports 12 by the keyboard 50.

Figure 2:
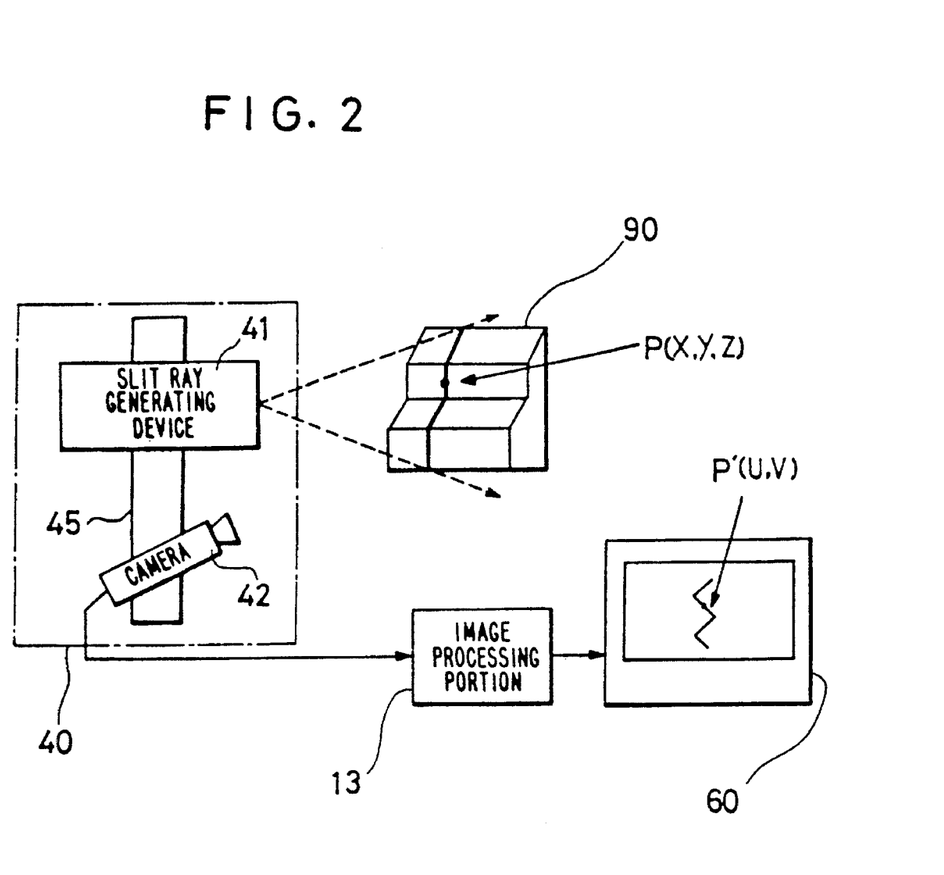
FIG. 2 is a block-schematic diagram of a non-contact type measurement system according to the present invention.

FIG. 2 is a diagram of the configuration of sensor 40 and the transmission system for the shape measurement and the image signals.

As shown in FIG. 2, the slit ray generator 41 and the camera 42 are fixed on the support 45, and said camera 42 scans the shadow profile of the object 90 to be measured or calibration block 100 (shown in FIG. 5) by using the slit-ray (plane-ray) generated by slit-ray generator 41. Said shadow profile scanned by the camera 42 is transmitted to CRT 60.

Figure 3:
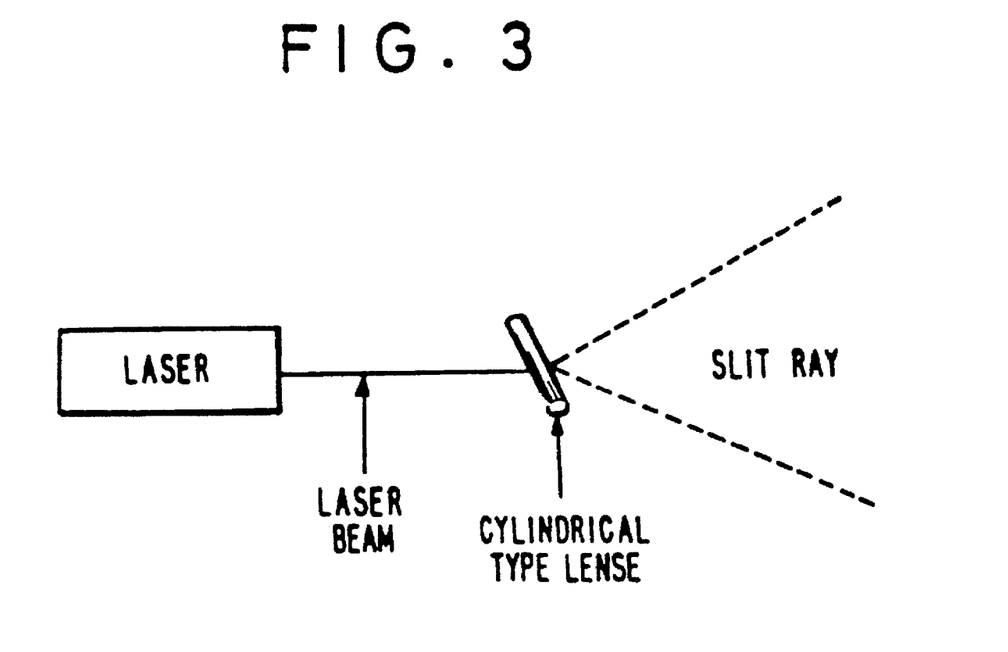
FIG. 3 is a schematic diagram of the slit-ray generator of the sensor according to the present invention.

A cylindrical lens of said slit-ray generator in FIG. 3, converts a laser beam generated by a laser into said slit-ray.

Figure 6:
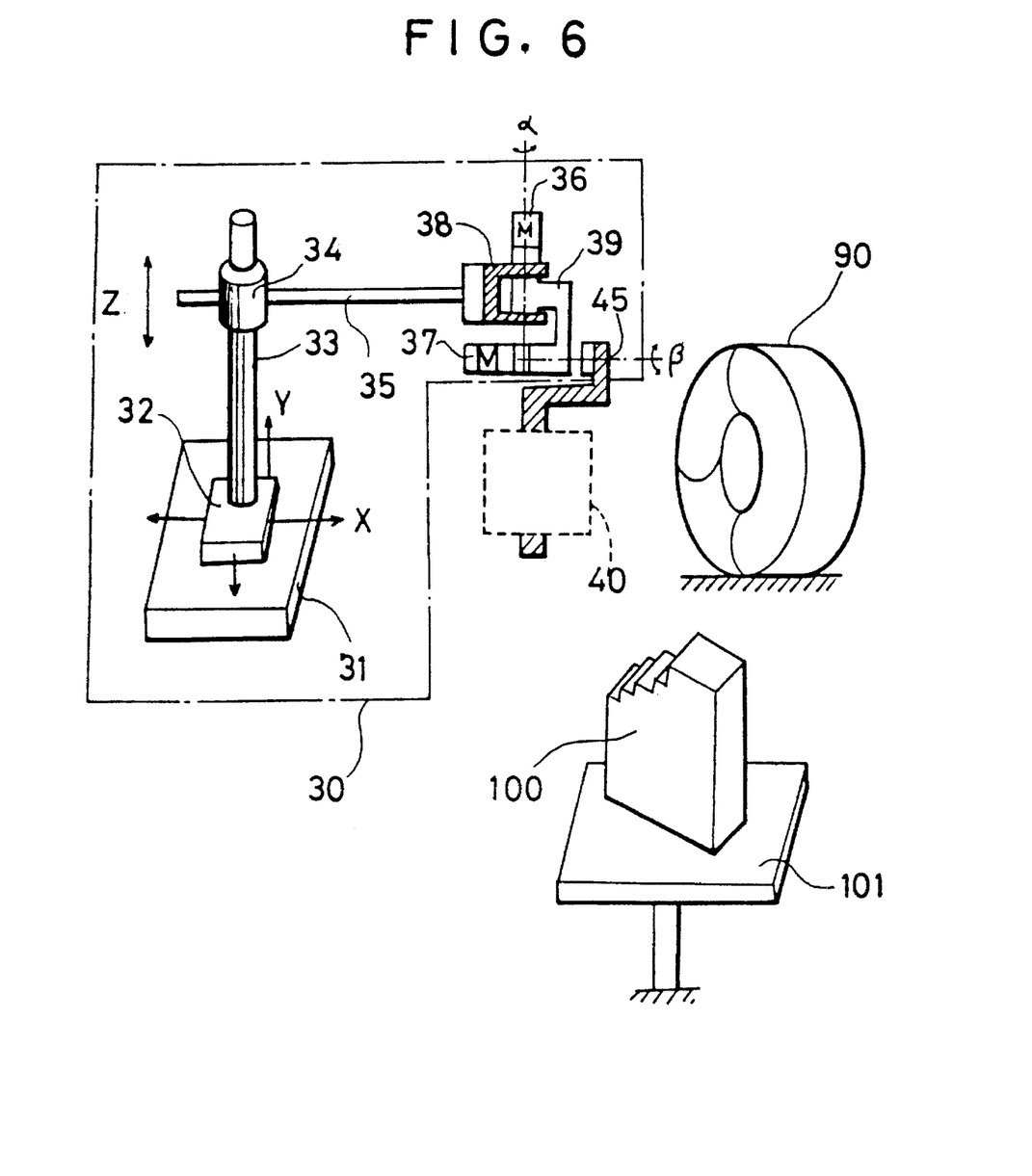
FIG. 6 is a schematic longitudinal section of a multiple axes type robot hand, and a layout of the relationship between the sensor, the object to be measured, and the calibration block.

As shown in FIG. 6, the robot hand 30 has a vertical rod 33 and horizontal rod 35. Rod 33 is fixedly mounted on the moving plate 32 which moves towards X and Y axes on the base 31. One end of a horizontal rod 35 is fixed on vertical rod 33, toward the top of the vertical rod by holder 34. Motor holder 38 is fixedly mounted on the other end of rod 35. A first motor 36 is fixedly mounted on the upper end of holder 38 so its output shaft is vertically disposed. The first holder 38 is connected with a second motor holder 39 on which is mounted a second motor 37 having a horizontally disposed output shaft. The shaft of motor 36 rotatably drives holder 39 and motor 37 about a vertical axis ($\alpha$) while the shaft of motor 37 drives support 45 for sensor 40 about a horizontal axis ($\beta$). By this mechanism described above, said sensor 40 can move both up and down. Also, in FIG. 6 is shown an arrangement of the object 90 to be measured and the calibration block 100 on the calibration stand 101, in which the position of the sensor can be controlled to irradiate a slit-ray so that a photo can be taken in any direction according to the position of said sensor.

Servomotors 311, 312 and 313 respectively drive encoders 314, 315 and 316 (FIG. 7), located on base 31 inside the robot hand 30. First and second stepping motors 36 and 37 are controlled by X,Y and Z axes servo controllers (21–23) and $\alpha$ and $\beta$ axes controllers 24 and 25, located inside the robot driver 20.

Figure 7:
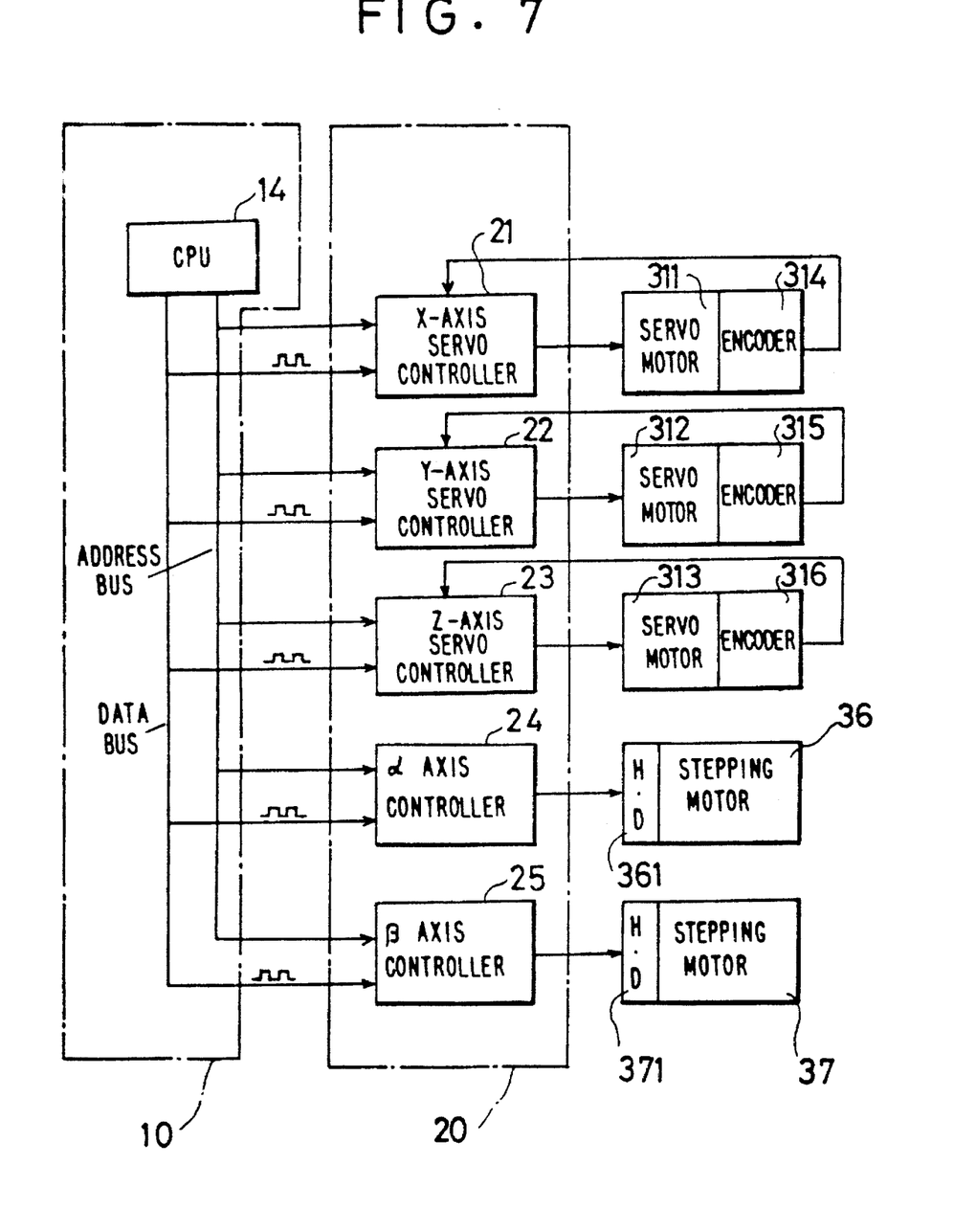
FIG. 7 is a block diagram of the robot hand driver of a preferred embodiment of the present invention.

Also, said X-Z servo controllers (21–23) and $\alpha$ and $\beta$ axes controllers (24, 25) are controlled by addresses and data of CPU 14 in the computer 10.

The sensor 40 consists of a slit-ray generator 41 and a camera 42 which are arranged on their fixed position. When a slit-ray from generator 41 is incident on the measured part of object 90, its measurement of profile shape is formed at the cross point of the object 90 and the slit-ray. Thereafter, by taking readings of the cross point with the camera 42, it is possible to obtain the same 2-dimensional image data of the profile as CRT 60 displays. These 2-dimensional data are transformed as discussed infra into 3-dimensional position data corresponding to the desired points in the part of the object irradiated by the slit-ray. As a result, the shape measurement of the object 90 as a tire is achieved.

After obtaining the value of the calibration parameters between 2-dimensional coordinates in the camera system from the calibration block 100, 3-dimensional space coordinates are obtained by matching it with said parameters. Said camera system includes one or more cameras and auxiliary devices such as plane ray irradiating equipment. To calibrate the camera system, it is necessary to know 3-dimensional coordinate values of at least a few points and coordinate values of the camera system corresponding to each of the few points.

Figure 12:
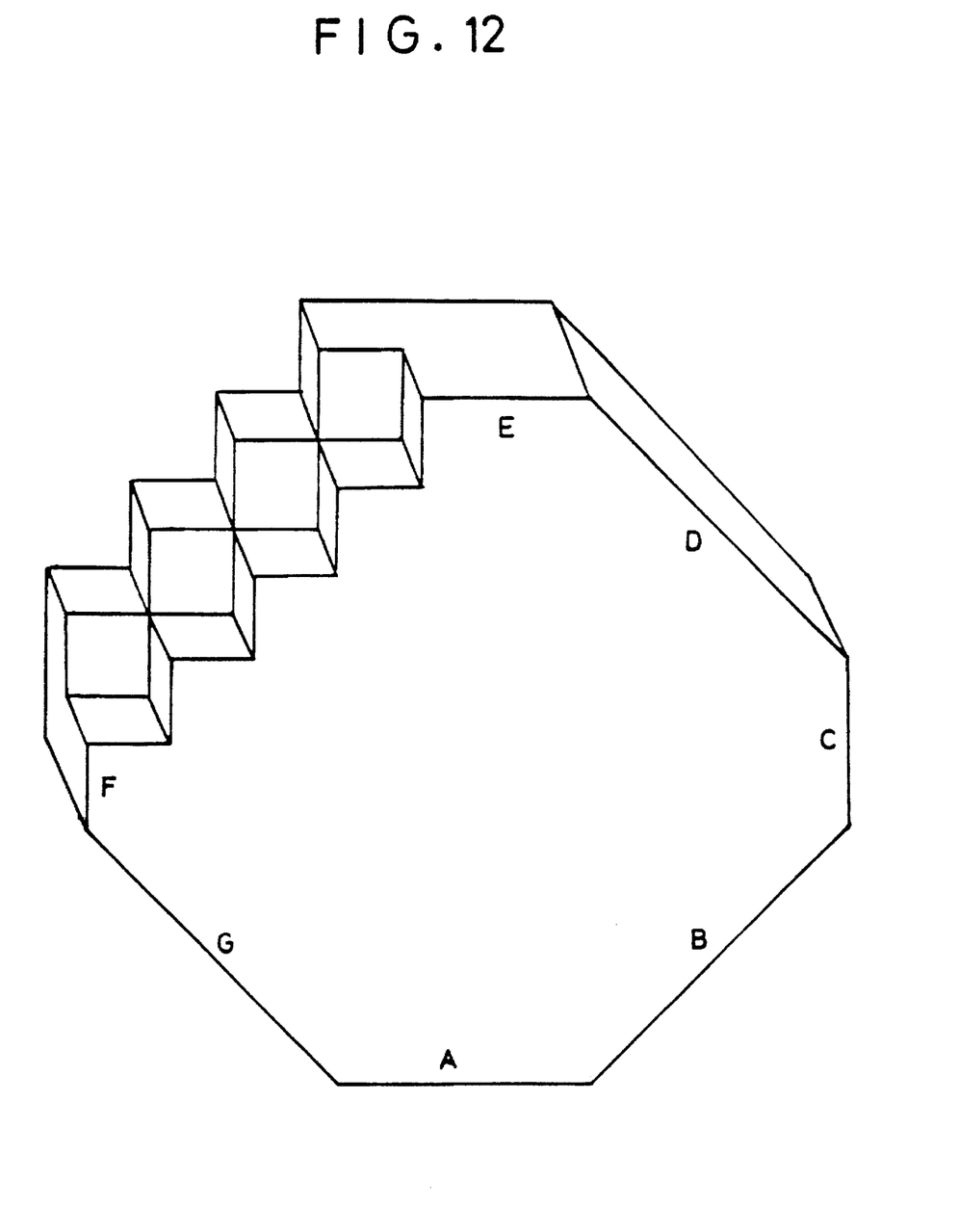
FIG. 12 is a schematic perspective view of a calibration block of a preferred embodiment of the present invention.

Referring FIG. 12, if the image of corners or stairs of the calibration block 100 is input to the camera 42 and is analyzed by the computer 10, they may be easily distinguished from other points, since the end and corner parts of the stairs are at right angles. Thereby the coordinate values regarding the respective points in 3-dimensional space coordinates may be found as distinctive points. Since the dimension from the reference plane to the stairs and their corners is already known, the 3-dimensional coordinate values of each stair and corner can be obtained, if only 3-dimensional coordinate values of the reference plane are found.

To calibrate the camera system to interpret the image data, when the image of one point P (x, y, z) in space is projected on the image plane of the camera, as in FIG. 2, the coordinates in the image system may be represented as P' (U, V). If P' is represented by the homogeneous coordinate, (u, v, h) can be used and the following equations (Eqs.) are obtained:

$$U = u/h \qquad (1)$$

$$V = v/h \qquad (2)$$

P and P' are related to each other as follows:

$$(x, y, z, 1)\, T = (u, v, h) \qquad (3)$$

$$T = \begin{bmatrix} C_{11} & C_{12} & C_{13} \\ C_{21} & C_{22} & C_{23} \\ C_{31} & C_{32} & C_{33} \\ C_{41} & C_{42} & C_{43} \end{bmatrix} \qquad (4)$$

From Eqs. (3) and (4)

$$C_{11}x + C_{21}y + C_{31}z + C_{41} = u \qquad (5)$$

$$C_{12}x + C_{22}y + C_{32}z + C_{42} = v \qquad (6)$$

$$C_{13}x + C_{23}y + C_{33}z + C_{43} = h \qquad (7)$$

Substituting Eqs. (1), (2) into Eqs. (5) and (6), $$C_{11}x + C_{21}y + C_{31}z + C_{41} = hU \qquad (8)$$

$$C_{12}x + C_{22}y + C_{32}z + C_{42} = hV \qquad (9)$$

Substituting Eqs. (7) into Eqs. (8) and (9), $$C_{11}x + C_{21}y + C_{31}z + C_{41} - C_{13}Ux - C_{23}Uy - C_{33}Uz - C_{43}U = 0 \qquad (10)$$

$$C_{12}x + C_{22}y + C_{32}z + C_{42} - C_{13}Vx - C_{23}Vy - C_{33}Vz - C_{43}V = 0 \qquad (11)$$

Eqs. (10), (11) may be used in the following three cases.

Case 1) The coordinate values on the image plane: if the transform matrix T and x, y, z are already known, the coordinate values on the image plane may be obtained, because unknown quantities are two variables (U, V), and the Eqs. are two.

Case 2) The measurement: if the transform matrix T and U, V are already known, the solution can not be obtained, because unknown quantities are three variables (x, y, z) and Eqs. are two formulas. In this case, one equation for the stereo vision or the slit-ray projection, must be used for the solution.

Case 3) The calibration: when the positions (x, y, z) of various points in 3-dimensional space and the image coordinates ($U_i$, $V_i$) of those points are known, the transform matrix T can be obtained. Because there are two equations (10), (11) and the unknown quantities are represented by twelve variables, the space coordinate values and image coordinate values (x, y, z, $U_i$, $V_i$) of 6 points are required ($i = 1, \cdots, 6$)

Assuming $C_{43}$ equals 1, because Eqs. (10), (11) are homogeneous equations, there are eleven variable unknown quantities, therefore, the unknown quantities can be obtained with more than 5.5 data.

Representing these equations in the matrix form $$\begin{matrix} x_1\, y_1\, z_1\, 1\, 0\, 0\, 0\, 0 & -U_1 x_1 & -U_1 y_1 & -U_1 z_1 & C_{11} & U_1 \\ 0\, 0\, 0\, 0\, x_1\, y_1\, z_1\, 1 & -V_1 x_1 & -V_1 y_1 & -V_1 z_1 & C_{21} & V_1 \end{matrix} \qquad (12)$$

$$\begin{bmatrix} x_2\,y_2\,z_2\,1\,0\,0\,0\,0 & -U_2x_2 - U_2y_2 - & U_2z_2 \\ \cdot & \cdot & \cdot \\ \cdot & \cdot & \cdot \\ \cdot & \cdot & \cdot \\ \cdot & \cdot & \cdot \\ \cdot & \cdot & \cdot \\ x_6\,y_6\,z_6\,1\,0\,0\,0\,0 & -U_6x_6 - U_6y_6 - & U_6z_6 \\ 0\,0\,0\,0\,x\,y\,z\,1 & -V_6x_6 - V_6y_6 - & V_6z_6 \end{bmatrix} \begin{bmatrix} C_{31} \\ C_{41} \\ C_{12} \\ C_{22} \\ C_{32} \\ C_{42} \\ C_{13} \\ C_{23} \\ C_{33} \\ C_{43} \end{bmatrix} \begin{bmatrix} U_2 \\ V_2 \\ U_3 \\ V_3 \\ U_4 \\ V_4 \\ U_5 \\ V_5 \\ U_6 \\ V_6 \end{bmatrix}$$

Equation (12) can be rewritten as $$AT = B \tag{13}$$

Obtaining T by using a Pseudo-inverse from Eq. (13), $$T = (A^tA)^{-1}A^tB \tag{14}$$

Where, as regards the calibration by a slit ray projection, one plane is determined by 3 points, its Eq. being $$a_1x + a_2y + a_3z + a_4 = 0 \tag{15}$$

Equation (15) is represented in a matrix form as:

$$(x\,y\,z\,1)\begin{bmatrix} a_1 \\ a_2 \\ a_3 \\ a_4 \end{bmatrix} = 0. \tag{16}$$

In order to find unknown quantities by the camera system alone, the Eqs. are not enough. Therefore, by simultaneously using the calibration by a plane ray, in addition to the calibration by the camera system and the slit ray, a 3-dimensional measurement is performed, and then the calibration parameters are obtained. Eqs. (3) and (4), related to the camera, and Eq. (16) related to the slit ray, leads to $$(x\,y\,z\,1)\begin{bmatrix} C_{11} & C_{12} & C_{13} & a_1 \\ C_{21} & C_{22} & C_{23} & a_2 \\ C_{31} & C_{32} & C_{33} & a_3 \\ C_{41} & C_{42} & C_{43} & a_4 \end{bmatrix} = (u\,v\,h\,0); \tag{17}$$

Eq. (17), leads to $$(X\,Y\,Z\,H) = (U\,V\,1\,0)\begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix} \tag{18}$$

$$= (U\,V\,1\,0)\begin{bmatrix} M_{11} & M_{12} & M_{13} & M_{14} \\ M_{21} & M_{22} & M_{23} & M_{24} \\ M_{31} & M_{32} & M_{33} & M_{34} \end{bmatrix}$$

From the relation between Eqs. (17) and (18)

$$x = X/H \to X - xH = 0 \tag{19}$$

$$y = Y/H \to Y - yH = 0 \tag{20}$$

$$z = Z/H \to Z - zH = 0 \tag{21}$$

From Eq. (18) and Eq. (19)

$$m_{11}U + m_{21}V + m_{31} - x(m_{14}U + m_{24}V + m_{34}) = 0 \tag{22}$$

$$m_{12}U + m_{22}V = M_{32} - y(m_{14}U + m_{24}V + m_{34}) = 0 \tag{23}$$

$$m_{13}U + m_{23}V = M_{33} - z(m_{14}U + m_{24}V = m_{34}) = 0 \tag{24}$$

In case where U, V, x, y, z are known, there are twelve variable unknown quantities (if $Ms_{43}$ equals 1, there are eleven variable unknown quantities), and three equations are used. Therefore, it is enough to know the space coordinate values and image coordinate values regarding at least four points.

These are represented in matrix form as $$\begin{bmatrix} U_1 & V_1 & 1 & 0 & 0 & 0 & 0 & 0 & - & U_1x_1 & - & V_1x_1 \\ 0 & 0 & 0 & U & V & 1 & 0 & 0 & - & U_1y_1 & - & V_1y_1 \\ 0 & 0 & 0 & 0 & 0 & 0 & U_1 & V_1 & 1 & - & U_1z_1 & - & V_1z_1 \\ & & & & & & & & & & & \\ U_4 & V_4 & 1 & 0 & 0 & 0 & 0 & 0 & - & U_1x_4 & - & V_4x_4 \\ 0 & 0 & 0 & U_4 & V_4 & 1 & 0 & 0 & - & U_1y_4 & - & V_4y_4 \end{bmatrix} \begin{bmatrix} m_{11} \\ m_{21} \\ m_{31} \\ m_{12} \\ m_{22} \\ m_{32} \\ m_{13} \\ m_{23} \\ m_{33} \\ m_{14} \\ m_{24} \end{bmatrix} \begin{bmatrix} x_1 \\ y_1 \\ z_1 \\ x_2 \\ y_2 \\ z_2 \\ x_3 \\ y_3 \\ z_3 \\ x_4 \\ y_4 \end{bmatrix} \tag{25}$$

Equation (25) can be rewritten as $$Tm = W \tag{26}$$

By using a Pseudo-inverse, the unknown quantity m is calculated as follows:

$$m = (T^tT)T^tW \tag{27}$$

Once m is determined, when the coordinates (U, V) of the points that are shown in the image coordinate system are known, corresponding 3-dimensional space coordinates are obtained. That is, if $M_{34}$ equals 1 in Eqs. (22), (23), and (24)

$$x = (m_{11}U + m_{21}V = m_{31})/(m_{14}U + m_{24}V + 1) \tag{28}$$

$$y = (m_{12}U + m_{22}V + m_{32})/(m_{14}U + m_{24}V + 1) \tag{29}$$

$$z=(m_{31}U+m_{23}V+m_{33})/(m_{14}U+m_{24}V+1) \quad (30).$$

From Eq. (25), to obtain Mij for a three-dimensional measurement by the sensor 40 which consists of the slit ray generator 41 and the camera 42, it is necessary to have data regarding at least four points in the calibration process.

Figure 5:
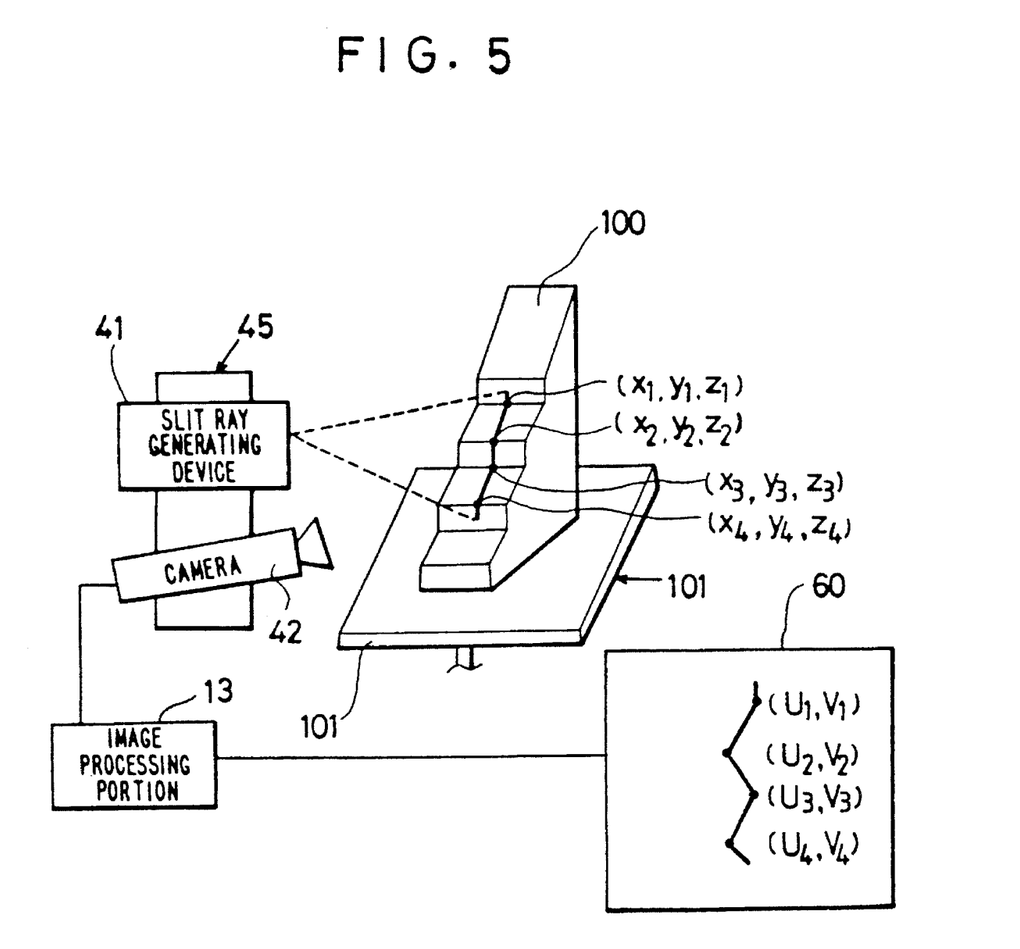
FIG. 5 is a block-schematic diagram of various parameters obtained by the calibration block.

Three-dimensional space coordinate values of these four points must be previously known. Therefore, when the irradiated part is viewed by the camera 32 after irradiating the stairs part of the calibration block 100, as shown in FIGS. 5 and 6 with a slit-ray, the image of the slit ray is read, as shown in FIG. 5 from CRT 60.

Then, by obtaining the m value as in Eq. (27), after substituting x, y, z values of known distinct points values ($x_1$, $y_1$, $z_1$, $x_2$, $y_2$, $z_2$, $x_3$, $y_3$, $z_3$, $x_4$, $y_4$, $z_4$) of the space coordinate system and U, V coordinates values of the image system ($U_1$, $V_1$, $U_2V_2$, $U_3$, $V_3$, $U_4$, $V_4$) inside of the sensor into Eq. (26), the sensor is calibrated.

For this calibration, after the corner points in the image system have been detected with CRT, the 2-dimensional coordinate values (U, V) in the image system about each point are obtained. Then, the 3-dimensional space coordinate values (X, Y, Z) must be compared with corresponding one by one values of the camera system coordinate values. The 3-dimensional space coordinate values of the respective corner points can be obtained by an actual measurement of the actual coordinates. To detect corners to obtain the image coordinate values of these corner points, the method of obtaining the curvature maximum point is used.

Figure 4:
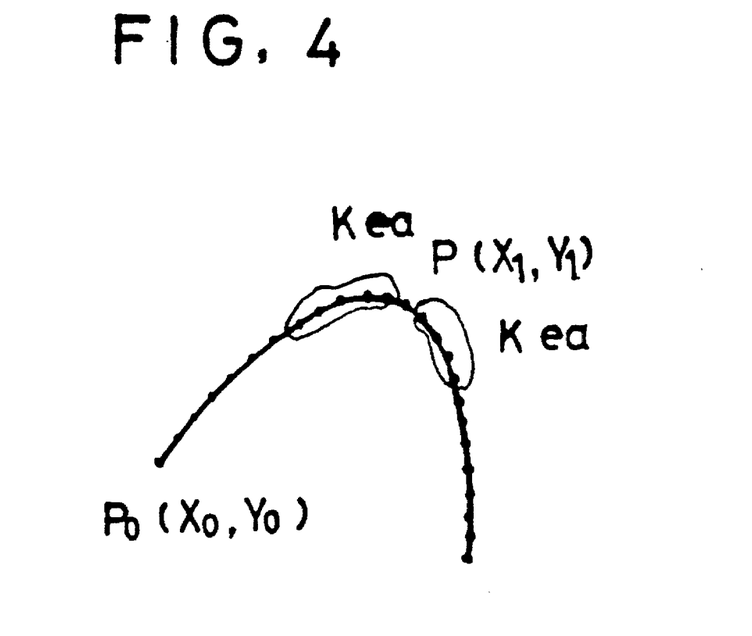
FIG. 4 is a curve containing data for calculating maximum curvature point to determine the distinctive points from the calibration block.

The curvature Cik at the line in the point Pi shown in FIG. 4 at Point $P_1(X_1, Y_1)$ is calculated by:

$$Cik = \frac{x'y'' - y'x''}{(X_{12} + Y_{12})3/2} \quad (31)$$

$$X' = (Xi=k/2-Xi-k/2)/(Si+k/2-Si-k/2) \quad (32)$$

$$X'' = (Xi+k-Xi)/(Si+k-Si) - (Xi-X_{i-k})/(Si-S_{i-k}) \quad (33); \text{ and}$$

$$Xi=X(Si)$$

Y', Y", Yi are also calculated by the same manner.

The maximum curvature Cim of the line is calculated from these values as:

$$Cim = max\{C_{ik}|h_i \leq k \leq h_2\} \quad (34)$$

The point $P_im$ has a maximum curvature Cim if it satisfies the conditions given below.

For all j conditioned as $$|i-j| \leq m/2 |C_{im}| > |C_{jn}| \quad (35)$$

where Cjn is the maximum curvature.

The distinctive points (i.e., corner points) represented by each U, V value of the image system which is displayed on CRT 60 by the method of obtaining the maximum curvature, are found. The calibration is completed by obtaining the transform parameter M (m matrix in Eq. 18) after calibration of the sensor 40. Based upon these values, the spatial position of each point is determined from Eqs. (28), (29), and (30).

Figure 8:
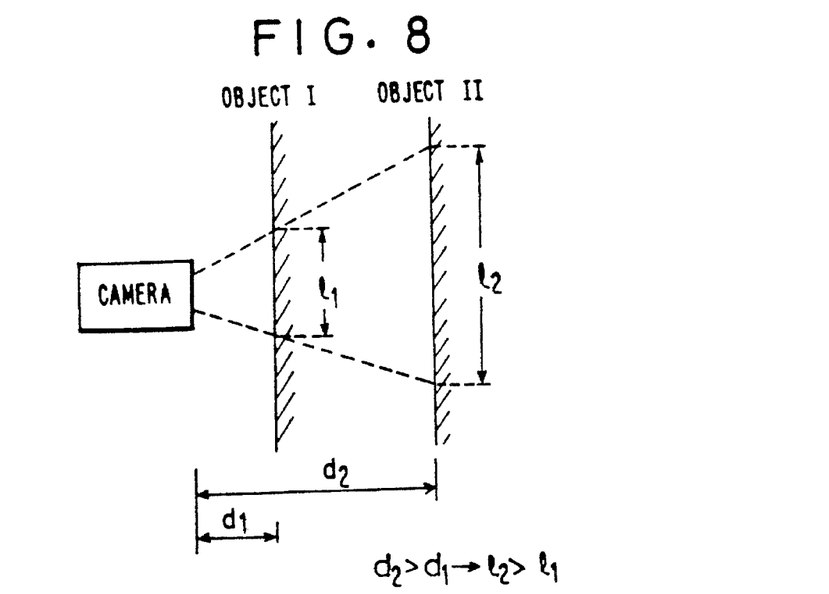
FIG. 8 is a schematic diagram indicating how measurement accuracy can be determined as a function of the distance between the sensor camera and the object to be measured according to a preferred embodiment of the present invention.

However, one factor that has an effect on accuracy in measurement of the system is the resolution of the camera 42 which is one of the component elements of the sensor 40. For instance, if the approximate length of the object to be measured (which one display area covers) is 50 m/m, and camera 42 has approximately 500 scanning lines the resolution is restricted to 0.1 m/m. Thus, if the length of the part to be measured is out of the range to be taken at a time, one display area can be taken by bringing the camera close to the object or adjusting the lens as shown in FIG. 8 so that the length of the object to be measured is within the range. The measuring accuracy may be increased thereby.

Figure 11:
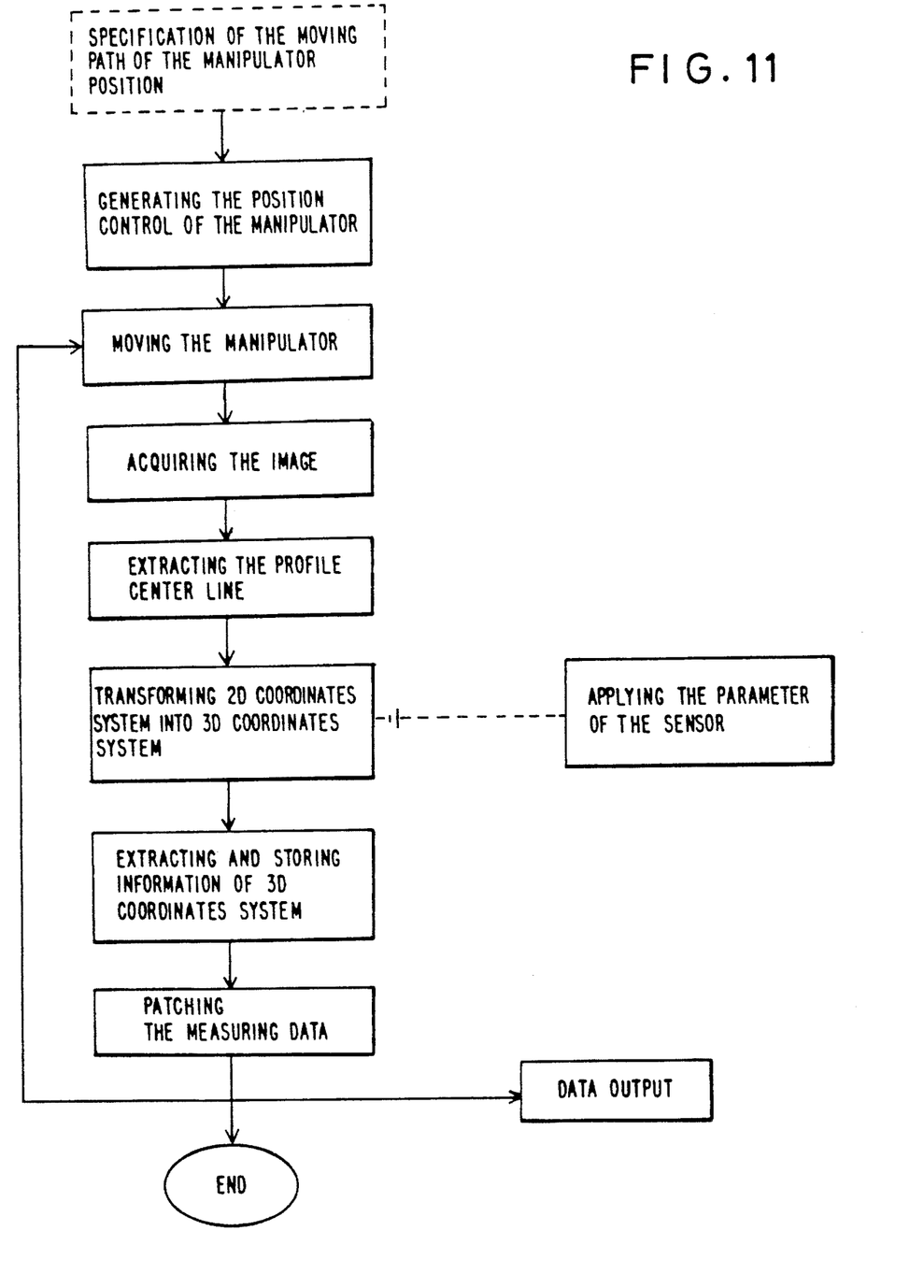
FIG. 11 is a flowchart of how measurements are obtained by a preferred embodiment of the present invention.

In case the entire measurement can not be made at one time, the measurement is made by moving the sensor 40 adequately around the object, and then connecting the results all together, as shown in FIG. 11.

As shown in the measuring flowchart of FIG. 11, the specification, of the moving path of the manipulator position is initially supplied by keyboard 50, FIG. 1. The control position of the manipulator is then generated, causing computer 10 to effective move the manipulator, robot driver 20 and robot hand 30. Movement of hand 30 causes sensor 40, including slit generator 41 and camera 42 to be moved so the camera responds to the reflected slit ray two-dimensional image from the object to extract the profile center line. Then, by applying the parameter of the sensor 40 into the information of the center line, the information of the 3-dimensional coordinates is acquired from the information of the 2-dimensional coordinates. Then, after storing the information, the measurement data are combined. Thereafter, the data are derived or the movement of the robot hand is again controlled, or is terminated.

Figure 10:
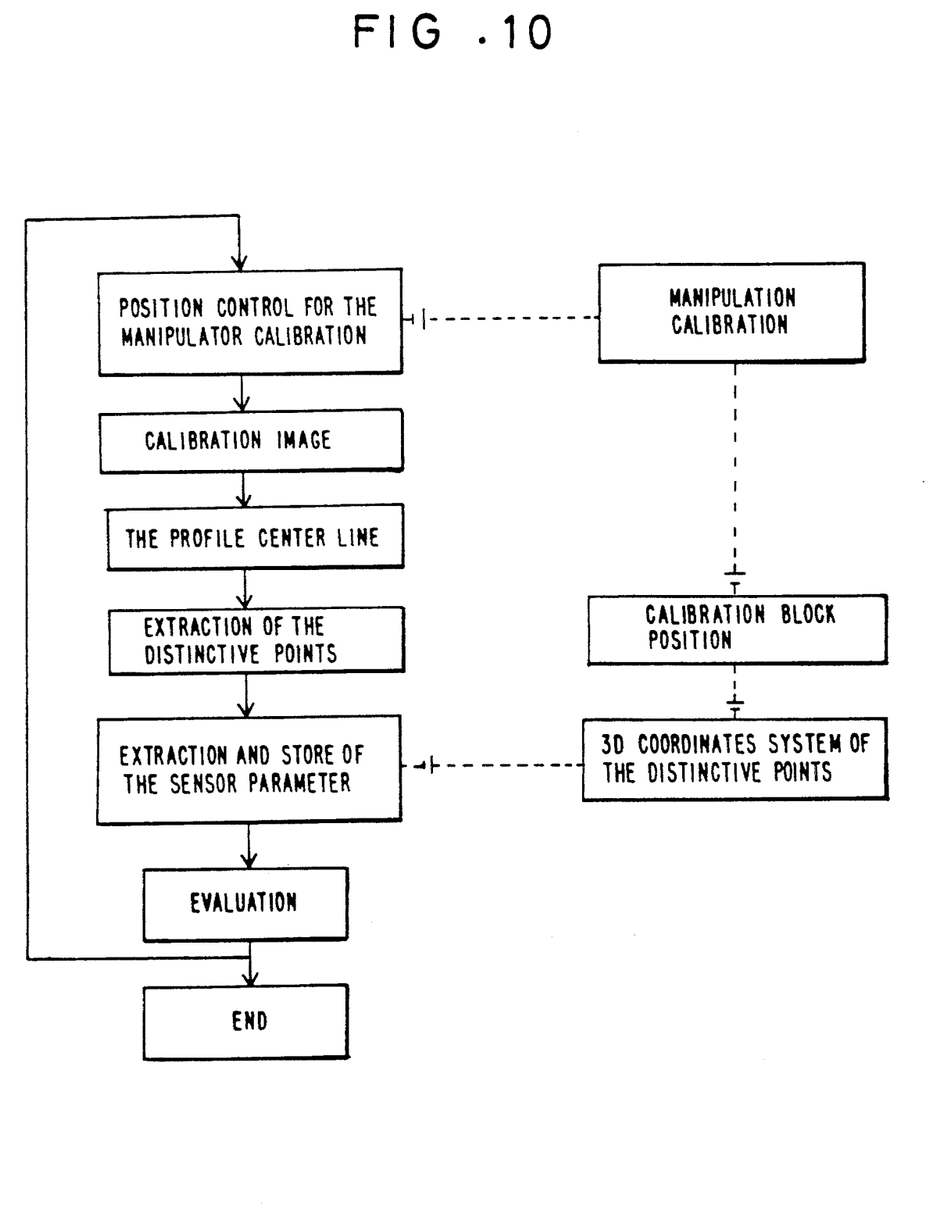
FIG. 10 is a flowchart of how a preferred embodiment of the present invention is calibrated.

Before an object is measured, the apparatus is calibrated using the flowchart of FIG. 10. The description of this is as follows. During calibration, the manipulator is moved to the calibration position, and the calibrator position is set.

When the calibration image is obtained at the calibration position of said manipulator, after finding out the distinctive points from the profile center line, parameters of the sensor are derived and stored. During this operation the 3-dimensional coordinate of the distinctive point is read out. Then if evaluation of these parameters indicates they are proper the calibration is terminated, but if the parameters are proper the manipulator is moved to the position for controlling the calibration of the manipulator.

On the other hand, the measurement, as is given above, can increase the measuring accuracy. In addition, it can remove the possibility for a dead angle which may occur during measurement.

Figure 9:
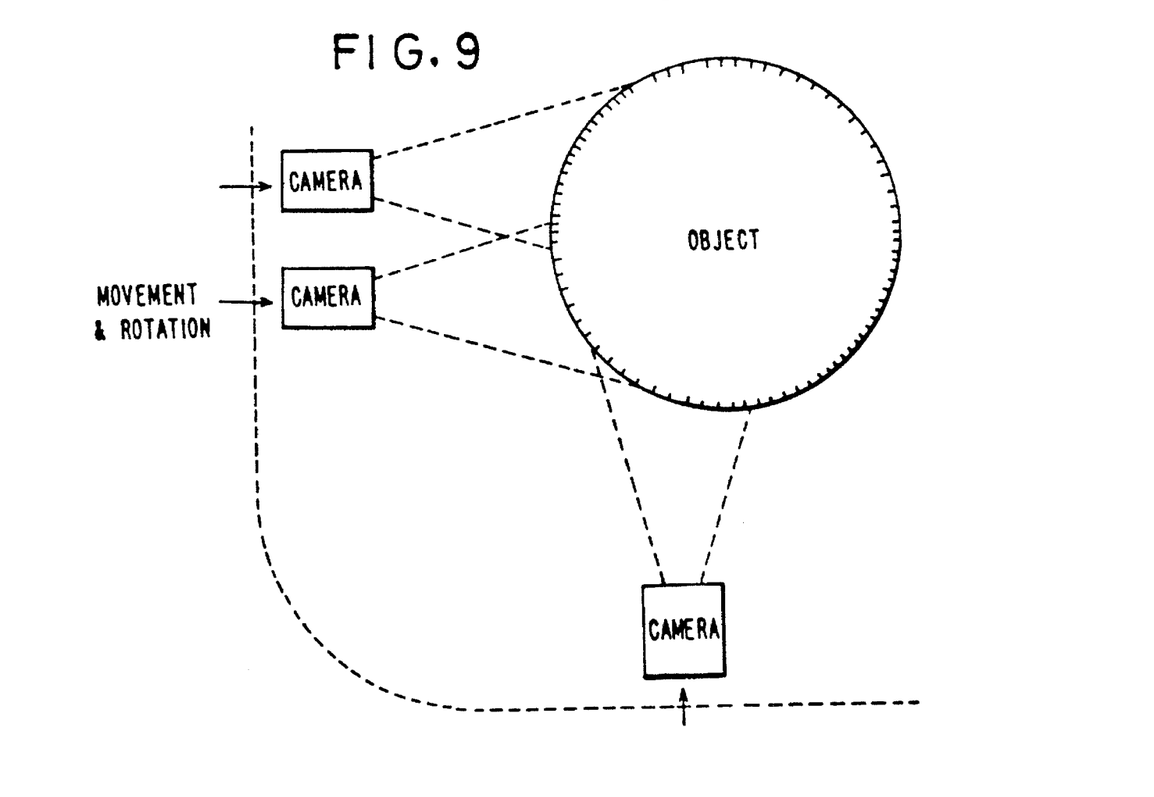
FIG. 9 is a schematic diagram indicating how a dead angle of an object is eliminated according to a preferred embodiment of the present invention.

A technique for preventing dead angle occurrence shown in FIG. 9, includes making measuring ranges of the object overlap, in advance, as the camera is moved by the robot hand. The measurement is performed by moving sensor 40 including camera 42 attached to the end of robot hand 30, as shown in FIG. 6.

In this case, since sensor 40 is moved and turned on three axes of a rectangular coordinate system and two axes of a rotating coordinate system, should be paid due consideration. For instance, if movement of the camera one arbitrary measured point of a tire is $x_1$, $y_1$, $z_1$ and the amounts of movement relative to to each axes (X, Y, Z) are p, q, r respectively, the amount of turning is $\alpha$, $\beta$. The actual measured values $x_2$, $y_2$, $z_2$ with the movement of the robot taken into consideration are $$(x_2, y_2, z_2) = (x_1, y_1, z_1)R + T \quad (36),$$

where, T=[p, q, r]: the moving amount of x, y, z axes; R is a matrix representing the turning. As shown in FIG. 6, the turning amount about 2 axis corresponds with the turning amount parallel to the Z axis, and the turning amount about the β axis corresponds to the turning amount parallel to the X axis or Y axis according to the amount of turning about the α axis (90 or 180). That is, $$R = AB \quad (37)$$

$$A = \begin{bmatrix} \cos\alpha_1 & \sin\alpha_1 & 0 \\ -\sin\alpha_1 & \cos\alpha_1 & 0 \\ 0 & 0 & 0 \end{bmatrix} \text{ : turning of } \alpha \text{ axis (parallel to } Z \text{ axis); or}$$

$$B = \begin{bmatrix} 1 & 0 & 0 \\ 0 & \cos\beta_1 & \sin\beta_1 \\ 0 & -\sin\beta_1 & \cos\beta_1 \end{bmatrix} \text{ : turning about the } \beta \text{ axis (parallel to } X \text{ axis)}$$

$$= \begin{bmatrix} \cos\beta_1 & 0 & -\sin\beta_1 \\ 0 & 1 & 0 \\ \sin\beta_1 & 0 & \cos\beta_1 \end{bmatrix} \text{ : turning about the } \beta \text{ axis (parallel to } Y \text{ axis)}$$

As a matter of convenience, the reference system of the coordinate values measured is at this time based on the coordinate values obtained during the calibration. For instance, in case that the tread of a tire is measured, because $\alpha=90°$, $\beta=90°$ (parallel to X axis), $$(x_2, y_2, z_2) = \qquad (38)$$

$$(x_1, y_1, z_1) \begin{bmatrix} \cos 90° & \sin 90° & 0 \\ -\sin 90° & \cos 90° & 0 \\ 0 & 0 & 1 \end{bmatrix} \begin{bmatrix} 1 & 0 & 0 \\ 0 & \cos 90° & \sin 90° \\ 0 & -\sin 90° & \cos 90° \end{bmatrix} + (p, q, r)$$

To represent these equations descriptively with reference to FIG. 6 and FIG. 7, to which the formula control process of a multiple spindle type robot hand 30 is attached, results in the following:

The data and address from the computer 10 are applied to X,Y and Z axes servo controllers 21–23 and $\alpha$, $\beta$ axes controllers 24, 25 in the robot driver 20, via a respective bus. Servo controllers 21–23 respond to the data from comparator 10 to respectively control servomotors 311–313 on base 31 to translate plate 32 in the X and Y directions and rod 35 in the vertical direction. Controllers 24 and 25 respond to the data from comparator 10 to respectively rotate sensor housing 40 about the $\alpha$ and $\beta$ axes. Thus, the moving plate 32 and rod 35 move in the directions of the X, Y and Z axes respectively causing sensor 40 (connected to rod 35 by motor holders 38 and 39 and the support 45) to be moved to scan the measured object 90. Each of the encoders 314–316, respectively coupled to servo motors respectively 311–313 encodes the turning angles of the servo motors and supplies signals indicative thereof to servo controllers 21–23. Robot driver 20 continuously receives these encoded signals from encoders 314–316 to control driving time of servomotors 311–314 to stop the servomotor when they have turned to the extent of the present limit signals.

On the other hand, $\alpha,\beta$ axes controllers 24 and 25 of robot driver 20 supply signals to stepping motors 36 and 37 via the harmonic drivers 361 and 371 (H. D, in FIG. 7). Thereby motor 36 (fixed to the holder 38 on one end of the horizontal bar 35) turns motor 37 and sensor 40 about the $\alpha$ axis while motor 37 (mounted on $\beta$ axis to which $\alpha$ axis is particular) turns sensor 40 about the $\beta$ axis. Thereby sensor 40 is moved around the object to be measured, scanning its shell shape.

In the present invention, as described above, the multiple-axis computer controlled robot hand carries camera 42 and slit ray generator 41. The section profile shape of the object to be measured is scanned by varying the rectilinear position and aspect angle of this single camera 42. The two dimensional image derived from the camera is combined with the rectilinear positional and aspect angle information of the camera to derive three-dimensional space coordinates of the object being measured. The object coordinates are obtained by match processing with the calibration block. The invention is particularly useful for quickly and accurately measuring a characteristic effect of the object, e.g., the section profile shape of tires, having side walls and tread.

It is to be understood that this description is intended as illustrative, rather than exhaustive, of the invention. Persons of ordinary skill in the relevant art may make certain additions to, deletions from, or changes in the embodiments described in this disclosure without departing from the spirit or the scope of the invention, as set forth in the appended claims.

What is claimed is:

1. A method of measuring a tire section profile shape comprising:

a) moving a sensor having a slit ray beam generator and a camera with a robot hand having mutually orthogonal longitudinal x, y and z axes and mutually orthogonal rotational $\alpha$, $\beta$ axes, the generator and camera being mounted in the sensor so they are moved together relative to the x, y, z, $\alpha$ and $\beta$ axes b) generating two-dimensional coordinate data by directing the slit ray beam relative to a calibration block and obtaining an image of said calibration block with said camera by moving the sensor and camera relative to said x, y, z, $\alpha$ and $\beta$ axes as specified in step (a), c) generating three-dimensional coordinate data of the calibration block by processing said two-dimensional data corresponding to actual dimensions of the calibration block with a computer, d) generating two-dimensional coordinate data of the tire by directing the slit ray beam relative to the tire and obtaining an image of the tire with said camera by moving the sensor and camera relative to said x, y, z, $\alpha$ and $\beta$ axes as specified in step (a), e) generating three-dimensional coordinate data of the tire section profile shape by processing in the computer said tire two-dimensional coordinate data corresponding with said three-dimensional coordinate data to generate data representing an image of the tire section profile shape based on a three-dimensional coordinate system, and f) transmitting the image to a two dimensional display having mutually orthogonal axes,
        the calibration block including plural polygonal sides forming plural stair faces, generating the three-dimensional coordinate data of the calibration block by directing the slit ray beam on the plural stair faces,
    the three-dimensional coordinate data of the calibration block being generated by directing the slit ray beam at four corner points of four different intersections of the stair faces,
    the corner points being detected by determining the maximum curvature of an image of the calibration block derived from the camera in response to the slit ray reflected from the calibration block.

* * * * *